United States Patent [19]
Burroughs

[11] Patent Number: 5,443,407
[45] Date of Patent: Aug. 22, 1995

[54] LUBRICATING MEANS FOR MARINE STEERING SYSTEM

[76] Inventor: Thomas C. Burroughs, 711 St. Ives Ct., Houston, Tex. 77079

[21] Appl. No.: 252,887

[22] Filed: Jun. 2, 1994

[51] Int. Cl.⁶ ............................................. B63H 25/10
[52] U.S. Cl. .................. 440/63; 114/144 R; 74/502.4; 184/15.1
[58] Field of Search ............... 114/144 R; 440/62, 63; 74/502.5, 502.6; 184/15.1

[56] References Cited

U.S. PATENT DOCUMENTS

| | | | |
|---|---|---|---|
| 2,083,937 | 6/1937 | Begg | 74/502.4 |
| 4,054,102 | 10/1977 | Borst et al. | 114/144 R |
| 5,080,197 | 6/1992 | Nelson | 184/15.1 |

*Primary Examiner*—Jesus D. Sotelo
*Attorney, Agent, or Firm*—Bush, Moseley, Riddle & Jackson

[57] ABSTRACT

A marine steering system for an outboard motor (M) has generally parallel cable devices (13, 13A) extending between a steering wheel (8) and outboard Motor (M) of a marine craft. The cable devices (13, 13A) include a pair of fixed control cable housings (14, 14A) and a pair of control cables (16) secured to slidable tubes (28) received within the housings (14, 14A) for sliding movement for steering the outboard motor. An inner control cable housing (14) is externally threaded and the outer control cable housing (14A) has a smooth outer peripheral surface. An internally threaded lubricating nut (52) is threaded on the inner control cable housing (14) for lubricating the telescoping tube or tubular member (28) secured to the control cable (16). A second lubricating nut (60) has a smooth inner bore defining a large diameter bore portion (62) to receive the outer control cable housing (14A) and a smooth small diameter bore portion (64) to receive the sliding tube (28) secured to the control cable (16). A set screw (82) secures nut (60) to the outer control cable housing (14A) and O-ring seals (68, 72) engage in sealing relation the outer cable housing (14A) and sliding tube (28).

10 Claims, 3 Drawing Sheets

LUBRICATING MEANS FOR MARINE STEERING SYSTEM

BACKGROUND OF THE INVENTION

1. Field of the Invention

This invention relates to lubricating means for the steering system of an outboard marine motor, and more particularly to such lubrication means for a steering cable and cable housing attached to the motor for pivoting the motor to a desired position.

2. Statement of the Prior Art

The marine steering system for an outboard motor, an inboard outdrive with an inboard motor, and an inboard motor employs a flexible coaxial cable of well known construction that extends through a flexible tube. The flexible tube is fixed at one end to the steering housing of the marine craft and is connected at its other end to a tubular control cable housing supported by the boat motor or boat depending on the type of boat propulsion system. The coaxial cable is mechanically connected at its end adjacent the steering wheel to a gear or a suitable mechanism so that when the steering wheel of the marine craft is turned, the coaxial cable is moved longitudinally within the flexible tube. The other end of the coaxial cable is connected to a tubular member reciprocable within the control cable housing. The tubular member is connected by linkage to turn either the motor and associated propeller or the rudder, depending upon the type of propulsion system for the boat.

Heretofore, problems have been encountered from corrosion or sediment accumulation in the control cable housing interfering or preventing free unrestricted longitudinal movement of the coaxial cable in the housing which may render the steering system difficult to operate or inoperable. It is not uncommon for the fouling of the control cable housing to require removal of the outboard motor from the boat and replacement of the control cable housing. Also, deterioration of the coaxial cable due to exposure of the coaxial cable to the water environment with which it is associated creates problems as it is substantially impossible to determine with any degree of accuracy the internal condition of the coaxial cable within the control cable housing without complete disassembly, and even then the interior condition of the coaxial cable may not be properly or adequately determined. Further, lubricant substantially increases the functional life of a coaxial cable and it is desired that the coaxial cable receive lubricant without disassembly of the steering system for inhibiting fouling of the cable housing and thereby increasing the operational life of the steering system.

U.S. Pat. No. 5,061,213 dated Oct. 29, 1991 illustrates a lubricating device for lubricating a control cable telescopically mounted within a control cable housing. A lubricating nut or adapter is shown having internal threads for threading on the end of the externally threaded control cable housing for securing of the nut. The cable is secured to a tube or tubular member which reciprocates within the outer cable housing and an O-ring seal is mounted within the lubricating nut to seal against the tube as the tube and cable move in and out. A lubricant fitting is in communication with a void area between the O-ring seal and outer cable housing to permit lubricant to be applied against the enter surface of this tube for lubricating the tube and facilitating the sliding reciprocal movement of the tube and cable secured thereto relative to the fixed outer cable housing.

Some of the so-called high performance outboard marine engines have high horsepower which creates high torque loads for the steering system. An operator of a marine craft having such a marine engine is required to exert a relatively large force in rotating the steering wheel of the steering system which could become tiring to the operator. For that reason, a dual cable steering system utilizing a roller clutch steering mechanism has been developed to reduce the torque required in steering the marine craft.

The dual cable steering system utilizes a pair of control cables extending from the clutch mechanism and arranged in a general parallel relation to each other for facilitating the pivotal movement of the outboard motor. Each of the control cables is secured to a tube which reciprocates within an outer fixed cable housing. An inner cable housing adjacent the outboard motor is secured to the mounting frame for the engine while an outer cable housing is mounted on the support for the inner cable housing. The inner cable housing has external screw threads for mounting of a lubricating nut, but the outer cable housing since carried or mounted on the support for the inner cable housing does not normally have external screw threads for securement of a lubricating nut.

An object of this invention is to provide lubricating means for a dual cable steering system for a high performance outboard marine engine.

A further object of the invention is to provide lubricating means for such a dual cable marine steering system including a lubricating nut particularly adapted for fitting on an unthreaded cable housing for a control cable for pivotal movement of the tiller arm for steering the marine motor.

SUMMARY OF THE INVENTION

The present invention is particularly directed to lubricating means for the steering system of high performance outboard marine engines in which a pair of generally parallel control cables are used for pivoting of the tiller or outboard engine. A pair of cables housings for the control cables are arranged in a side-by-side relation with an inner cable housing adjacent the engine secured to the mounting bracket for the outboard motor and having external screw threads adapted to receive a lubricating nut such as illustrated in the aforementioned U.S. Pat. No. 5,061,213. The other outer cable housing has a smooth outer peripheral surface without any screws threads thereon and the lubricating nut of the present invention is particularly adapted for fitting on the outer cable housing adjacent an end thereof for lubricating the smooth outer surface of the reciprocal telescoping tube and cable secured thereto which are received within the outer cable housing.

The lubricating nut of this invention includes a small diameter portion having an O-ring within a groove therein adapted to receive the reciprocal tube in sealing relation, and a large diameter portion having an O-ring within a groove therein adapted to receive the outer cable housing therein in a sealing relation. A set screw extending through the body of the nut engages the outer cable housing to secure the nut to the cable housing. A lubricant fitting is mounted within an opening through the nut body located between the pair of O-ring seals and permits the supply of lubricant to a void area between the two O-ring seals for lubricating the outer surface of the reciprocal tube as it moves back and forth during operation of the outboard marine motor.

Other objects, features, and advantages of this invention will becomes more apparent after referring to the following specification and drawings.

DESCRIPTION OF THE INVENTION

Figure 1:
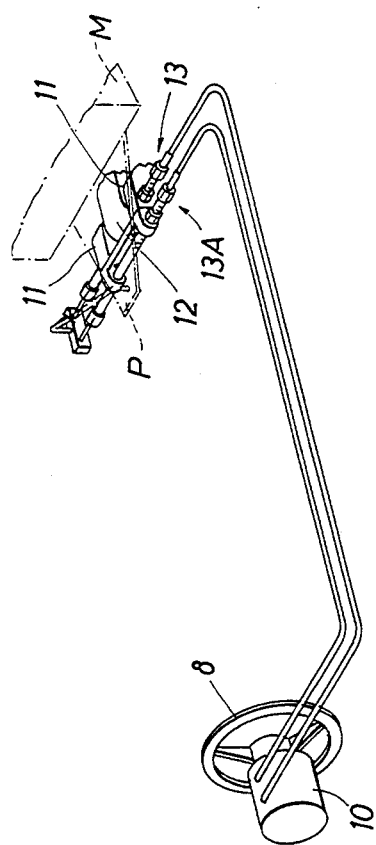
FIG. 1 is a schematic view of the present invention shown mounted on a tiller associated with an outboard motor on the transom of a boat utilizing a pair of control cables extending to a steering wheel for a dual cable marine steering system.

Referring to the drawings for a better understanding of the invention and more particularly to FIG. 1, a marine steering system for a marine craft or boat is illustrated schematically including a steering wheel 8 secured to a shaft extending to a roller clutch steering mechanism at 10 for a dual cable steering system. A dual cable steering system is utilized primarily for high performance, high horsepower outboard motors for reducing the torque required for steering thereby facilitating the rotation of steering wheel 8 by an operator. An outboard motor is shown at M and has spaced mounting brackets 11 clamped to the transom T of a boat. A tilting mounting frame 12 for tilting motor M is mounted for pivotal movement about tubular housing or tilt tube 14 supported on brackets 11.

Figure 3:
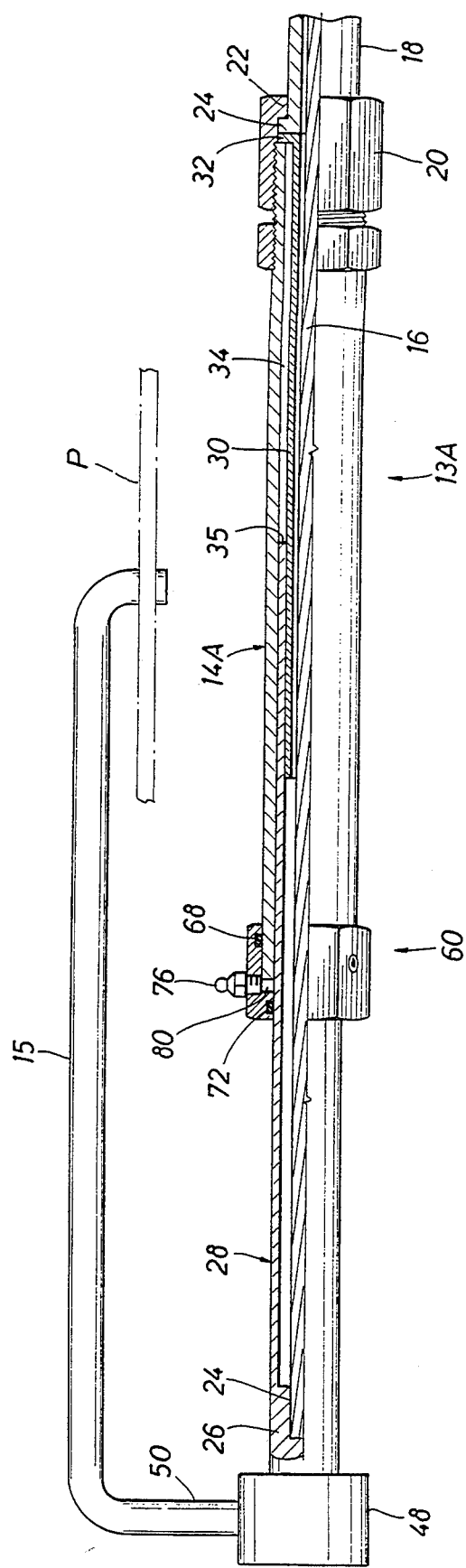
FIG. 3 is a sectional view taken generally along line 3—3 of FIG. 2.

Two separate generally parallel cable devices indicated at 13 and 13A extend between the clutch steering mechanism 10 and mechanical link or rod 15 connected to a tiller arm P for motor M for pivoting of motor M. Cable devices 13 and 13A form respective inner and outer cable devices relative to motor M. Each cable device 13, 13A has a flexible metal control cable 16 encased in an outer flexible sheath 18. Flexible sheath 18 extends between clutch steering mechanism 10 and an internally threaded connector 20. Connector 20 as shown particularly in FIG. 3 for cable device 13A has an inwardly extending end flange at 22 in retaining engagement with an outwardly extending end flange 24 on sheath 18 for retaining sheath 18 thereat. Cable 16 is secured at its end 24 to the extending end 26 of sliding tubular member or rod 28. Sliding tubular rod 28 is received in telescoping relation within tube or tubular housing 14A for cable device 13A and within a similar tubular housing or tilt tube 14 for cable device 13 as shown in FIG. 3. A fixed inner control cable housing 30 has an end flange 32 fitting against end flange 24 of sheath 18 and in abutting relation to the adjacent end of tubular member 14A. Connector 20 is threaded on the end of tubular member 14A to secure sheath 18 and inner cable housing 30. An annular space 34 is provided between tubular member 14A and inner cable housing 30 defining a void area to receive sliding tubular rod 28 therein with end 35 of rod 28 shown in space 34. Annular space 34 is of a sufficient length to receive tubular rod 28 throughout its entire reciprocal travel within outer tubular housing 14A.

Figure 2:
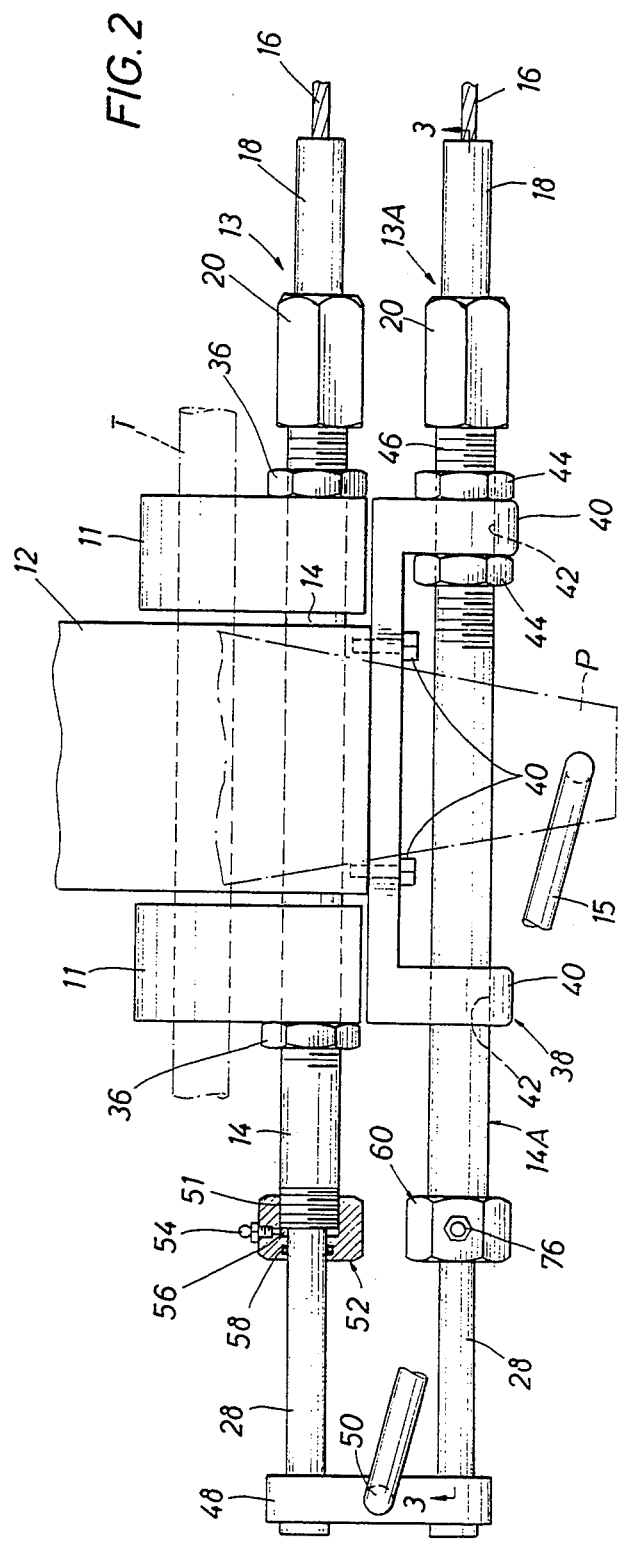
FIG. 2 is an enlarged plan view, partly diagrammatic, showing the dual control cables in side by side relation with the lubricating nut of the present invention on the outer control cable.

As shown in FIG. 2, lock nuts 36 engage external threads on tubular housing or tilt tube 14 to secure tilt tube 14 to spaced brackets 11. A U-shaped mounting bracket generally indicated at 38 is bolted at 39 to mounting frame 12 and has spaced extensions or ears 40 with openings 42 therein receiving tubular housing 14A. Lock nuts 44 on opposed sides of one extension 40 engage external screw threads 46 on tubular member 14A to secure tubular housing 14A to bracket 38. A cross member 48 is secured to the extending ends of slidable rods 28 and link 15 is pivotally connected at 50 to cross member 48. Rotation of steering wheel 8 by an operator of the boat effects sliding movement of slidable rods 28 to pivot tiller arm P and motor M.

As slidable rods 28 move back and forth within tubular members or housing 14 and 14A during operation of a boat, it is desirable to lubricate the outer surface of slidable rods 28. Inner tubular member 14 normally has an externally threaded end as shown at 51 and a lubricating nut or adapter 52 is threaded onto tubular member 14 as shown in FIG. 2. Lubricant through lubricant fitting 54 is supplied to an annular void 56 to provide lubricant to the outer surface of rod 28. An O-ring 58 provides a seal to retain the lubricant and may also act as a wiper for the outer surface of slidable rod 28. A suitable lubricating nut for threading onto a tubular member 14 is shown in aforementioned U.S. Pat. No. 5,061,213, the entire disclosure of which is incorporated herein.

Figure 5:
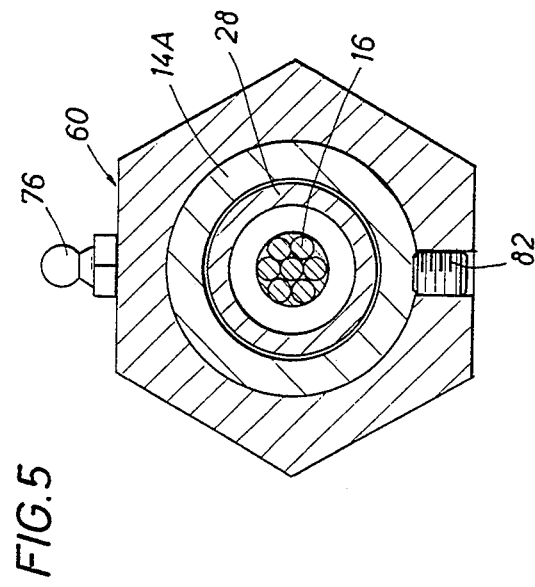
FIG. 5 is a sectional view taken generally along line 5—5 of FIG. 4.
Figure 4:
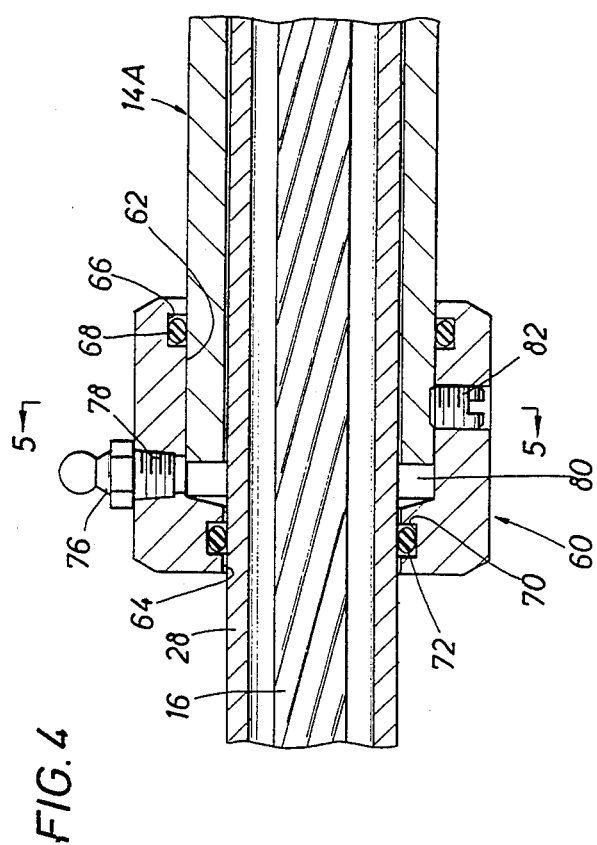
FIG. 4 is an enlarged sectional view of the lubricating nut of the present invention shown in FIG. 2.

Outer tubular member 14A is not externally threaded on its extending end and lubricating nut 60 is mounted on tubular member 14A as shown particularly in FIGS. 4 and 5. Nut 60 has a large diameter smooth bore portion 62 and a small diameter smooth bore portion 64. An annular groove 66 in bore portion 62 receives an O-ring 68 therein in sealing engagement with the outer surface of tubular member 14A. An annular groove 70 in bore portion 64 receives an O-ring 72 therein in sealing engagement with the outer surface of slidable rod 28. Lubricant fitting 76 is mounted within an internally threaded opening 78 in nut 60 in communication with annular space 80 about rod 28 for the supply of lubricant to the outer surface of rod 28. An externally threaded screw 82 with an internally threaded opening in nut 60 engages tubular member 14A to secure nut 60 onto the end of tubular member 14A.

Thus, from the above, an arrangement has been illustrated for lubricating a pair of slidable rods connected to a pair of control cables controlled by the steering wheel of a boat. A dual cable steering system is utilized primarily for high performance or high horsepower outboard engines.

Figure 6:
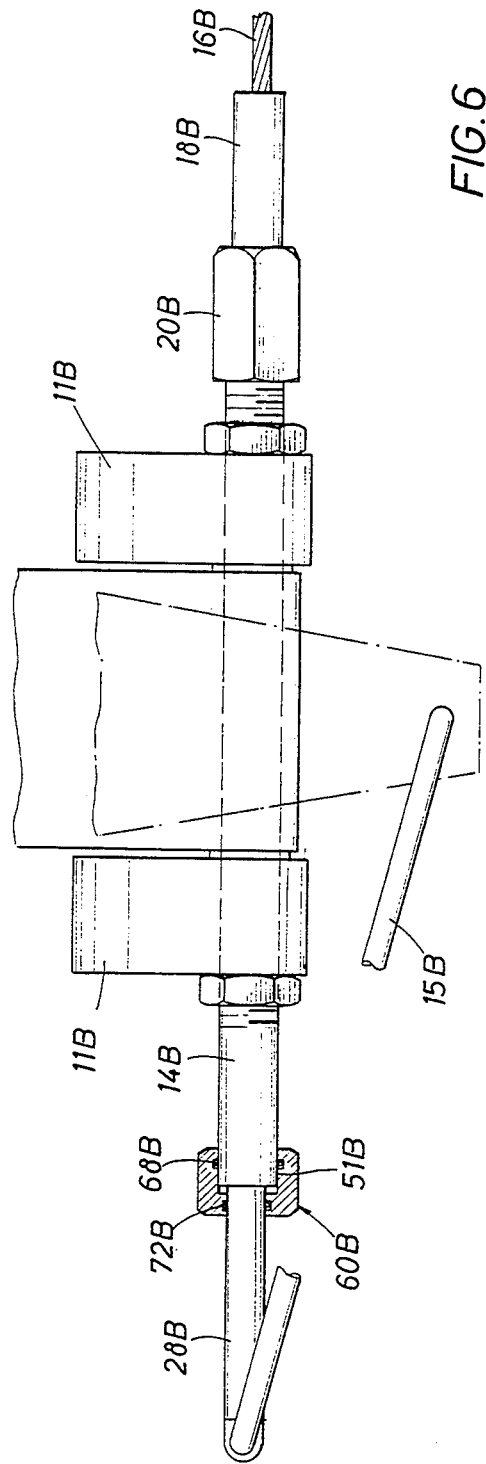
FIG. 6 is an elevational view showing the lubricating nut of the present invention on a single cable and mounted on the bracket for an outboard motor.

In some instances, a tilt tube or tubular member may not have an externally threaded end for mounting of an internally threaded lubricating nut. For this purpose, a separate embodiment is shown in FIG. 6 in which a tilt tube or tubular housing 14B has a smooth outer end portion shown at 51B. Slidable rod 28B is secured within tubular housing 14B and tubular housing 14B is supported on motor mounting brackets 11B which are mounted on the transom of a boat. Flexible sheath 18B receiving cable 16B is secured by connector 20B. A lubricating nut 60B similar to lubricating nut 60 in the embodiment of FIGS. 1-5 is secured to the end of tubular housing 14B. O-rings 68B and 72B provide seals for the lubricant in the same manner as O-rings 68 and 72 in nut 60. Thus, nut 60B is adapted for utilization in a single cable steering system.

The present invention has been illustrated in its application and use in connection with an outboard motor mounted on the transom of a marine craft. However, it is to be understood that this invention may be used with other motors for marine craft or boats which employ a coaxial cable for steering the boat. For example, a cable housing receiving a control cable for an inboard/outboard drive system, may be mounted directly on the transom instead of the motor support frame.

While preferred embodiments of the present invention have been illustrated in detail, it is apparent that modifications and adaptations of the preferred embodiments will occur to those skilled in the art. However, it is to be expressly understood that such modifications and adaptations are within the spirit and scope of the present invention as set forth in the following claims.

What is claimed is:

1. In a dual cable steering system for an outboard motor on a marine craft having a steering wheel and a pair of generally parallel cable devices extending between the steering wheel and a tiller arm of the outboard motor for steering of the motor, and mounting means for the outboard motor including a tilt tube between a pair of spaced brackets secured to the transom of the marine craft;

one of said cable devices being an inner cable device with said tilt tube defining a cable housing and the other of said cable devices being an outer cable device with respect to said motor, said other cable device having a generally channel shaped support bracket secured to said mounting means for said motor and having a pair of extensions supporting a cable housing thereon;

each of said cable devices including a control cable and a slidable rod secured to an end of said control cable and mounted in telescoping relation within the associated cable housing;

a lubricating nut mounted on an end of the cable housing for each cable device and receiving the associated slidable rod, said lubricating nut having a body with an annular groove therein; an O-ring in said annular groove engaging said slidable rod in sealing relation, a lateral opening extending through said body in fluid communication with said slidable rod, and a lubricant fitting mounted within said opening to permit the supply of lubricant therein;

the lubricating nut for said inner cable device being internally threaded with the associated cable housing being externally threaded for receiving said nut thereon in threaded relation;

the lubricating nut for said other cable device having a generally smooth internal bore defining a small diameter smooth bore portion and a large diameter smooth bore portion, said large diameter smooth bore portion having a second annular groove therein, and an O-ring in said second annular groove engaging said associated cable housing in sealing relation, said associated cable housing having an end portion with a smooth outer surface thereon supporting said lubricating nut; and means securing said lubricating nut for said other cable device onto said smooth outer surface of said associated cable housing.

2. In a marine steering system for steering an outboard motor mounted for pivotal movement on a mounting bracket on the end of a marine craft, the steering system including a fixed externally threaded cable housing fixed to the mounting bracket receiving a sliding telescoping rod and control cable secured to the rod, and an internally threaded lubricating nut threaded on the external threaded cable housing for lubricating the outer periphery of the sliding telescoping rod; the improvement comprising:

a second cable housing supported from said mounting bracket and arranged in side-by-side parallel relation to said first mentioned cable with an end portion of said second cable housing having a smooth outer peripheral surface;

a second rod received in sliding telescoping relation within said second cable housing;

a second control cable secured to said second tube for movement therewith; and a second lubricating nut mounted on said second cable housing about said smooth outer peripheral surface thereof; said second lubricating nut including:

a body having a central bore defining a large diameter smooth bore portion and a small diameter smooth bore portion;

an annular groove in said large diameter bore portion and an annular groove in said small diameter bore portion;

an annular seal in each of said annular grooves;

a first lateral opening extending through said body to said central bore in the area between said annular seals;

a lubricant fitting mounted within said opening to permit the supply of lubricant therein to lubricate said second rod;

a second lateral opening extending though said body to said large diameter bore portion and being internally threaded; and an externally threaded set screw threaded within said second lateral opening adapted to engage the outer surface of said control cable housing received within said large diameter bore portion to secure said control cable housing therein.

3. In a marine steering system as set forth in claim 2, a cross member secured to the extending ends of said rods, and a tiller arm secured to said motor at one end and pivotally connected to said cross member for steering of the marine craft.

4. A marine steering system for steering an outboard motor mounted for pivotal movement on a mounting bracket on the end of a marine craft; said steering system comprising:

a pair of control cable housings supported from said mounting bracket in a parallel relation to each other to define inner and outer control cable housings, said outer cable housing having a smooth outer periphery;

a pair of tubular members mounted in telescoping relation within said control cable housings for sliding back and forth movement, each of said tubular members having a control cable secured thereto for movement;

a steering wheel operatively connected to said control cables for pivoting of said outboard motor to a desired position for guidance of said marine craft; said inner control cable housing being externally threaded at an extending end thereof;

a first lubricating nut having an internally threaded body threaded on said inner control cable housing and having an annular seal in sealing engagement with the outer periphery of the associated tubular member;

a lateral opening extending through said body;

a lubricant fitting mounting within said opening to supply lubricant to the outer periphery of the tubular member to facilitate the sliding movement of said tubular member; and a second lubricating nut mounted on said outer control cable housing including:

a body having a central bore defining a large diameter smooth bore portion and a small diameter smooth bore portion;

an annular groove in said large diameter smooth bore portion and an annular groove in said small diameter bore portion;

an annular seal in each of said annular grooves;

a first lateral opening extending through said body to said central bore in the area between said annular seals and in fluid communication with the associated tubular member;

a lubricant fitting mounted within said opening to permit the supply of lubricant to the outer periphery of the associated tubular member;

a second lateral opening extending though said body to said large diameter bore portion and being internally threaded; and an externally threaded set screw threaded within said second lateral opening adapted to engage the outer surface of said control cable housing received within said large diameter bore portion to secure said control cable housing therein.

5. A lubricating nut for the control cable and control cable housing of a marine steering system wherein the control cable is connected to a slidable tubular member that is telescopically movable in and out relative to the control cable housing in response to the rotation of the steering wheel of the marine steering system; said lubricating nut comprising:

a body having a central bore defining a large diameter smooth bore portion and a small diameter smooth bore portion;

an annular groove in said large diameter bore portion and an annular grove in said small diameter bore portion;

an annular seal in each of said annular grooves;

a first lateral opening extending through said body to said central bore in the area between said annular seals and in fluid communication with the outer periphery of said tubular member;

a lubricant fitting mounted within said opening to permit the supply of lubricant to said tubular member;

a second lateral opening extending though said body to said large diameter bore portion and being internally threaded; and an externally threaded set screw threaded within said second lateral opening adapted to engage the outer surface of said control cable housing received within said large diameter bore portion to secure said control cable housing therein.

6. A lubricating nut as set forth in claim 5 wherein said nut is formed of stainless steel.

7. A lubricating nut as set forth in claim 5 wherein said nut is formed of aluminum.

8. A lubricating nut as set forth in claim 5 wherein each of said annular seals comprises an elastomeric O-ring.

9. In a dual cable steering system for an outboard motor on a marine craft having a steering wheel and a pair of generally parallel cable devices extending between the steering wheel and a tiller arm of the outboard motor for steering of the motor, and mounting means for the outboard motor including a tilt tube between a pair of spaced brackets secured to the transom of the marine craft;

one of said cable devices being an inner cable device with said tilt tube defining a cable housing and the other of said cable devices being an outer cable device with respect to said motor, said other cable device having a generally channel shaped support bracket secured to said mounting means for said motor and having a pair of extensions supporting a cable housing thereon;

each of said cable devices including a control cable and a slidable rod secured to an end of said control cable and mounted in telescoping relation within the associated cable housing;

a lubricating nut mounted on an end of the cable housing for each cable device and receiving the associated slidable rod, said lubricating nut having a body with an annular groove therein; an O-ring in said annular groove engaging said slidable rod in sealing relation, a lateral opening extending through said body in fluid communication with said slidable rod, and a lubricant fitting mounted within said opening to permit the supply of lubricant therein;

the lubricating nut for said inner cable device being internally threaded with the associated cable housing being externally threaded for receiving said nut thereon in threaded relation; the lubricating nut for said outer cable device having a smooth internal bore defining a small diameter smooth bore portion and a large diameter smooth bore portion, said large diameter smooth bore portion having a second annular groove therein, and an O-ring in said second annular groove engaging said associated cable housing in sealing relation, said associated cable housing having an end portion with a smooth outer surface thereon mounting said lubricating nut; and a set screw securing said lubricating nut for said outer cable device to the associated cable housing.

10. In a dual cable steering system for an outboard motor on a marine craft having a steering wheel and a pair of generally parallel cable devices extending between the steering wheel and a tiller arm of the outboard motor for steering of the motor, and mounting means for the outboard motor including a tilt tube between a pair of spaced brackets secured to the transom of the marine craft;

one of said cable devices being an inner cable device with said tilt tube defining a cable housing and the other of said cable devices being an outer cable device with respect to said motor, said outer cable device supporting a cable housing thereon;

each of said cable devices including a control cable and a slidable rod secured to an end of said control cable and mounted in telescoping relation within the associated cable housing;

a lubricating nut mounted on an end of the cable housing for each cable device and receiving the associated slidable rod, said lubricating nut having a body with an annular groove therein; an O-ring in said annular groove engaging said slidable rod in sealing relation; and a lubricant opening extending through said body in fluid communication with said slidable rod to permit the supply of lubricant therein;

the lubricating nut for said outer cable device having a generally smooth internal bore defining a small diameter smooth bore portion and a large diameter smooth bore portion, said large diameter smooth bore portion having a second annular groove therein, and an O-ring in said second annular groove engaging said associated cable housing in sealing relation, said associated cable housing having an end portion with a smooth outer surface thereon mounting said lubricating nut; and means securing said lubricating nut for said outer cable device on said smooth outer surface of the associated cable housing.

* * * * *